No. 634,239. Patented Oct. 3, 1899.
W. Y. HARDING.
FURROW OPENER.
(Application filed May 31, 1899.)
(No Model.) 2 Sheets—Sheet 1.
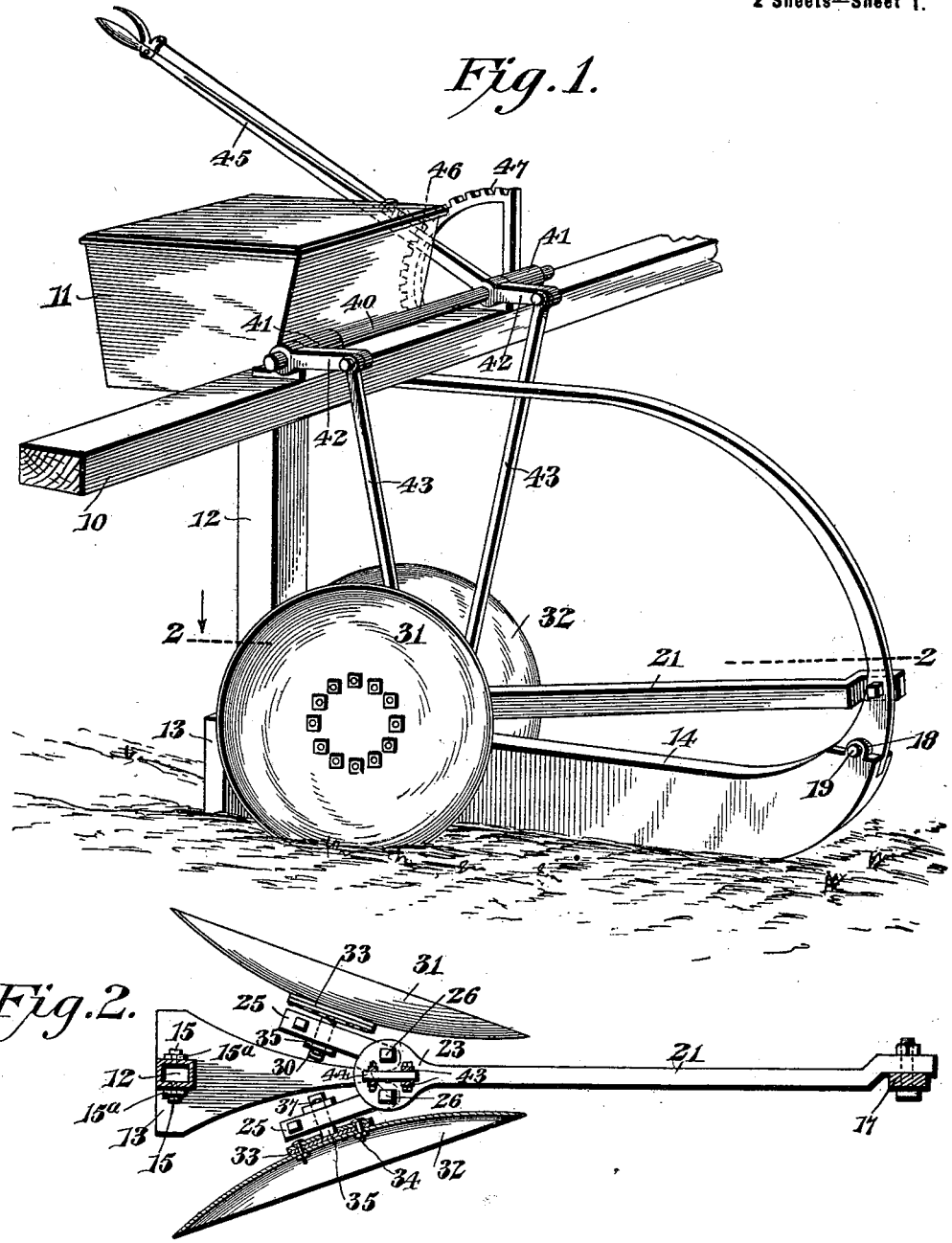
Witnesses
Jas. F. McCathran
Geo. H. Chandlee
W. Y. Harding Inventor
By his Attorneys,
C. A. Snow & Co.

No. 634,239. Patented Oct. 3, 1899.
W. Y. HARDING.
FURROW OPENER.
(Application filed May 31, 1899.)
(No Model.) 2 Sheets—Sheet 2.
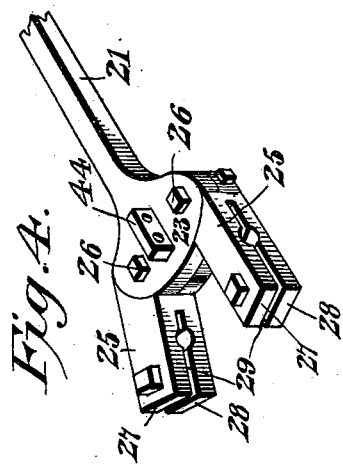
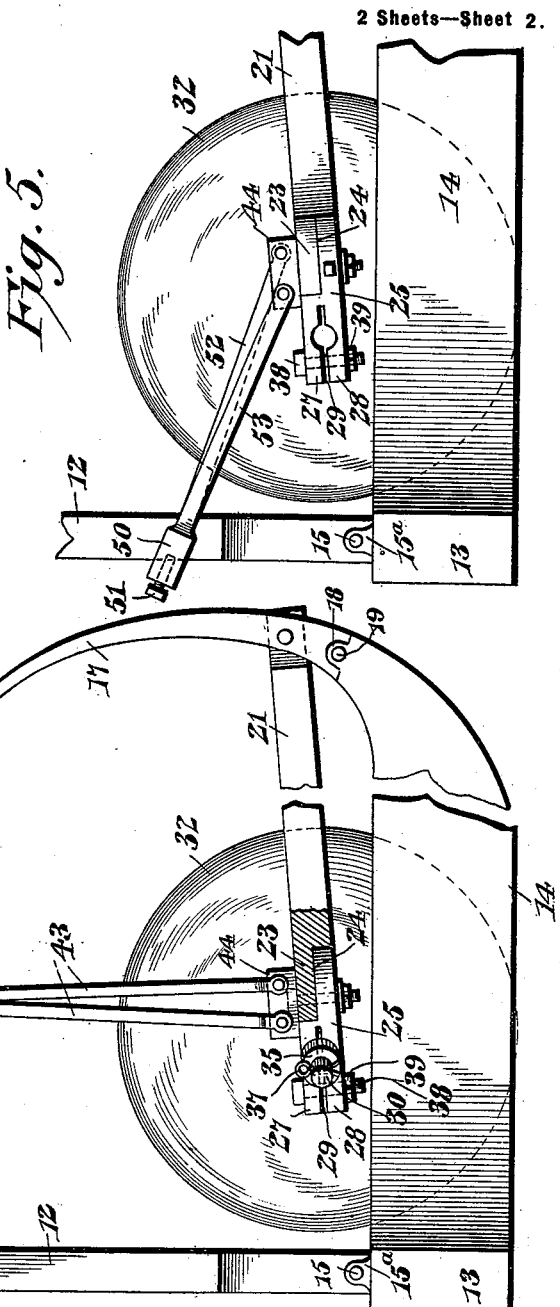
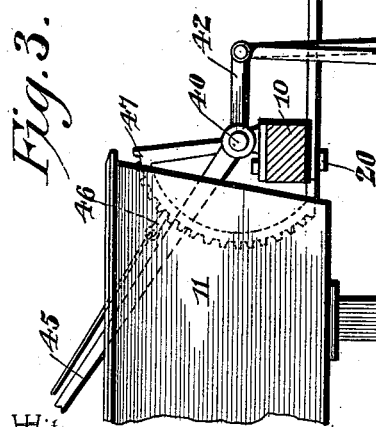
Witnesses
Jas. K. McCathran
Geo. H. Chandler
W. Y. Harding Inventor
By his Attorneys,
C. A. Snow & Co.
THE NORRIS PETERS CO., PHOTO-LITHO., WASHINGTON, D. C.

UNITED STATES PATENT OFFICE.

WILLIAM Y. HARDING, OF CHANUTE, KANSAS, ASSIGNOR TO DAVID W. MATSLER, OF SAME PLACE.

FURROW-OPENER.

SPECIFICATION forming part of Letters Patent No. 634,239, dated October 3, 1899.

Application filed May 31, 1899. Serial No. 718,833. (No model.)

*To all whom it may concern:*

Be it known that I, WILLIAM Y. HARDING, a citizen of the United States, residing at Chanute, in the county of Neosho and State of Kansas, have invented a new and useful Furrow-Opener, of which the following is a specification.

This invention relates to attachments for planting-machines comprising a furrow-cutting shoe and means for delivering the seed to the furrow when opened.

The object of the invention is to provide an attachment to be used in connection with the usual form of furrow-cutting shoe, through the medium of which the dirt from the furrow may be easily and efficiently moved laterally to afford a level and deep bed for the reception of the seed at a uniform depth with a resulting deeper and better rooting of the plants.

The device is applicable to a planter of any general style, whether adapted for the planting of corn, potatoes, or any other seed.

The invention consists of the combination, with the furrow-cutting shoe, of supplemental disks which are dished on their outer faces and which travel, one at each side of the shoe, and act to engage the dirt from the furrow and force it farther outwardly to make a broader ditch. These disks are adjustably mounted, so that they may be disposed at different angles with respect to each other and with respect to the cutting-shoe, and are, furthermore, adjustable vertically, so as to enter the ground at different depths with respect to the bottom edge of the shoe.

In the drawings forming a portion of the specification and in which like numerals of reference designate similar parts in the several views, Figure 1 is a perspective view showing a portion of a planter with a furrow-cutting shoe attached thereto and showing my opener connected therewith. Fig. 2 is a section on line 2 2 of Fig. 1, the disk being shown in elevation at one side and in section at the other. Fig. 3 is a side view of the mechanism, showing one of the disks removed and the adjacent portion of the head of the drag-bar being shown in section. Fig. 4 is a detail perspective of the rear head of the drag-bar. Fig. 5 is a side elevation of the rear portion of the furrow-cutting shoe with one of the opening-disks adjacent thereto and showing a different means for adjusting and holding the disks in their vertical positions.

Referring now to the drawings, 10 represents the cross-beam in a common style of planter and to which beam or with which beam is usually connected the axle for the supporting-wheels of the frame. Upon the beam 10 is arranged a hopper 11 for the reception of seed of any desired character and from which hopper leads downwardly a vertical delivery-chute 12, the lower end of which is passed through the rear end 13 of a furrow-cutting shoe 14 and with which rear end the chute is connected through the medium of bolts 15, passed through ears 15ª upon the shoe and into the chute. The rear end of the shoe is broadened, as in the usual construction. The shoe 14 is tapered forwardly in a horizontal plane and the forward end is bent upwardly and is connected with a brace 17 through the medium of ears 18, between which the lower end of the brace is passed and with which it is held in connection by means of a pin 19. The brace 17 is curved upwardly and rearwardly and is connected with the under side of the cross-beam 10 through the medium of a bolt or screw 20.

Pivotally connected with the brace 17 adjacent the connection thereof with the forward end of the shoe is an arm 21, the end of which is offset in order to bring said arm into vertical alinement with the shoe. The rear end of the arm 21 is provided with a horizontally-extending circular head 23, having an undercut portion 24, in which is arranged the rear ends of disk-supporting links 25, said links having their extremities connecting with said head reduced vertically, that portion of each of said links extending beyond the head having a vertical thickness substantially equal to the head. The links 25 are adjustably pivoted to the head 23 through the medium of bolts 26, passed through alining perforations in the head and links and having clamping-nuts upon their lower ends, through the medium of which nuts the links may be clamped firmly upon the under sides of the head of the arm 21 and against pivotal movement, this bolt connection enabling the adjustment of the links to lie at different angles with respect to each other. The protruding ends of the links 25 are bifurcated horizontally to form upper and lower members 27 and 28, respectively, and coinciding with the slot 29 of each link is formed an annular bearing-perforation for the shaft or stud 30, upon which the furrow-opening disks are mounted. These furrow-opening disks 31 and 32 each consist of a dished plate in the form of a disk, centrally of which and on its convexed side is bolted a washer 33 through the medium of bolts 34, said washer being attached rigidly to its respective stud 30. Upon the outer end of the stud 30 is disposed a washer 35, beyond which is formed a perforation for the reception of a key or pin 37, which holds the stud against outward displacement. Passed through vertical alining perforations in the upper and lower members 27 and 28 is a clamping-bolt 38, having a nut 39 in threaded engagement therewith, and through the medium of which bolt and nut the members 27 and 28 may be adjusted to compensate for the wear to the stud in its bearing. It will be readily understood, of course, that I may employ any desired style of bearing at this point and, if preferred, the disks and their carrying-washers may be rotatably mounted upon the studs, which latter may be fixed in the links.
It will be seen that when the links 25 are pivotally adjusted to vary their mutual angle a similar adjustment of the disks will be accomplished, so that said disks may be caused to open the furrow to different extents.
In order to adjust the disks vertically with respect to the shoe, I have shown in Fig. 1 of the drawings a mechanism comprising a shaft 40, mounted in bearings 41 upon the beam 10, and which shaft carries two outwardly-extending crank-arms 42, to the outer ends of which are pivotally connected connecting-rods 43, the lower ends of which are pivoted to an ear 44 upon the drag-bar head, said connecting-rods being connected at opposite sides of the ear through the medium of bolts, as shown. A lever 45, which may, if desired, be formed integral with one of the crank-arms 42, is mounted upon the shaft 40 and carries a dog 46, adapted to engage a notched segment 47, fitted upon the beam 10. The position of this lever 45 is such that in its pivotal movement adjacent the segment 47 it will operate the connecting-rod 43 to raise and lower the head of the drag-bar 21, and therewith the disks 31 and 32, the dog holding the lever in its different adjusted positions and having a common form of operating means. Through the medium of the rigid connections between the lever 45 and the disks the latter may be forced downwardly into the earth to different depths.

Referring now to Fig. 5 of the drawings, in this form of my invention I omit the connecting-rods 43 and their operating mechanism and in place thereof I employ a block 50, slidably mounted upon the chute 12 and having a set-screw 51, adapted to hold it at different elevations upon the chute. From the front end of the block 50 extends two arms 52 and 53, one of which is connected at each side of the ear 44 upon the head of the drag-bar through the medium of bolts, as shown, whereby said block 50 may be adjusted vertically of the chute to vary the height of the disks.

Thus it will be seen that as the machine advances the shoe 14 will cut a furrow and that the disks will rotatably engage the earth at the sides of the furrow thus cut and will force the earth outwardly with the formation of a broad-base ditch, into which the seed may be deposited and may be then covered, thus insuring a deep planting of the seed, with a resultant strong rooting and healthy growth.

It will be readily understood that I may employ this invention in connection with any form of shoe or planter, that I may vary the specific construction shown and described, and may employ any of a number of different details without departing from the spirit of my invention.

Having thus described the invention, what is claimed is—

1. The combination with a planter and the frame thereof, of a hopper upon the frame a shoe connected with the frame, a chute leading from the hopper and passed through and connected with the shoe, a drag-bar pivotally connected with the shoe, slotted links adjustably connected with the drag-bar and adapted to lie at various angles with respect to each other, bearings in the links opening into the slots, shafts journaled in said bearings, disks carried by the shafts and adjustable with the links, and means for adjusting said disks vertically.

2. The combination with a planter and the frame thereof, of a hopper upon the frame a shoe connected with the frame, a chute leading from the hopper and passed through and connected with the shoe a drag-bar pivotally connected with the shoe and having an enlarged head, a slotted link pivotally connected with said head at each side of the shoe, a bearing in each link opening into the slot through the shaft in each bearing, means for clamping the links upon the bearings, a disk connected with each shaft, an ear upon the head, and means connected with said ear for moving the drag-bar on its pivot to adjust the disks vertically.

3. The combination with a planter, comprising a frame, of a hopper mounted upon the frame and having a chute leading therefrom, a shoe tapered forwardly and having its rear end connected with the chute and through which said chute opens, a connection between the forward end of the shoe and the frame, a drag-bar pivotally connected with said connections, links adjustably connected with the drag-bar and adapted to lie at various angles with respect to each other, disks carried by the links and adjustable therewith, an ear carried by the drag-bar, a rock-shaft mounted upon the frame, connections between said shaft and the ear, and means for rocking said shaft to raise and lower the disks.

In testimony that I claim the foregoing as my own I have hereto affixed my signature in the presence of two witnesses.

WILLIAM Y. HARDING.

Witnesses:
  B. F. SHINN,
  E. B. FORTNEY.